US 10,694,082 B2

(12) United States Patent
Immel

(10) Patent No.: US 10,694,082 B2
(45) Date of Patent: Jun. 23, 2020

(54) FIN SHAPED UNDERWATER CAMERA HOUSING AND SYSTEM INCORPORATING SAME

(71) Applicant: John Immel, St. Cloud, FL (US)

(72) Inventor: John Immel, St. Cloud, FL (US)

(*) Notice: Subject to any disclaimer, the term of this patent is extended or adjusted under 35 U.S.C. 154(b) by 0 days.

(21) Appl. No.: 15/969,097

(22) Filed: May 2, 2018

(65) Prior Publication Data

US 2018/0324341 A1 Nov. 8, 2018

Related U.S. Application Data

(60) Provisional application No. 62/500,227, filed on May 2, 2017.

(51) Int. Cl.
| | |
|---|---|
| *H04N 5/225* | (2006.01) |
| *B63B 32/00* | (2020.01) |
| *G03B 17/02* | (2006.01) |
| *G03B 17/42* | (2006.01) |
| *G03B 17/30* | (2006.01) |
| *G03B 19/04* | (2006.01) |
| *B60R 11/04* | (2006.01) |
| *B63B 32/66* | (2020.01) |

(52) U.S. Cl.
CPC .......... *H04N 5/2252* (2013.01); *B60R 11/04* (2013.01); *B63B 32/00* (2020.02); *G03B 17/02* (2013.01); *G03B 17/30* (2013.01); *G03B 17/42* (2013.01); *G03B 17/425* (2013.01); *G03B 19/04* (2013.01); *B63B 32/66* (2020.02)

(58) Field of Classification Search
CPC ...................................................... B60R 11/04

USPC ......................................................... 396/411
See application file for complete search history.

(56) References Cited

U.S. PATENT DOCUMENTS

| | | | | |
|---|---|---|---|---|
| 5,778,259 A | * | 7/1998 | Rink .................... | H04N 5/2252 |
| | | | | 206/316.2 |
| 7,955,006 B1 | * | 6/2011 | Harvey ................. | F16M 11/10 |
| | | | | 396/12 |

(Continued)

OTHER PUBLICATIONS

Dorsal Fins, https://www.dorsalfins.com/collections/dorsal-surfboard-fins Aug. 31, 2015, 6 pgs (Year: 2015).*

(Continued)

*Primary Examiner* — Clayton E. LaBalle
*Assistant Examiner* — Kevin C Butler
(74) *Attorney, Agent, or Firm* — GrayRobinson, P.A.; Thomas C. McThenia, Jr.

(57) ABSTRACT

The present invention provides a board mountable system for filming underwater video. The inventive board mountable system can be mounted to the underside of water vehicles for incorporating a camera for filming from an underwater perspective. The inventive board mountable system is shaped to minimize drag as a result of the mounted camera or camera system. Embodiments of the inventive system includes a fin shaped housing for holding a camera or camera system. In certain embodiments, the fin is removably attached to the water vehicle, such as a surf board, where the fin housing can be swapped with other fins being used with the water vehicle for controlling the direction of a watersports board in motion. These embodiments of the inventive system further include a connection means for connecting the fin to the underside of a water vessel.

1 Claim, 3 Drawing Sheets

(56) References Cited

U.S. PATENT DOCUMENTS

| | | | | |
|---|---|---|---|---|
| 9,969,469 | B1* | 5/2018 | Bell | B63B 35/7926 |
| 10,059,411 | B1* | 8/2018 | Ebrahimi | B63B 7/02 |
| 10,150,544 | B2* | 12/2018 | Schibli | B63H 16/08 |
| 2006/0216007 | A1* | 9/2006 | Moreb | A01K 97/00 |
| | | | | 396/25 |
| 2013/0051779 | A1* | 2/2013 | Londeree | G03B 17/08 |
| | | | | 396/25 |
| 2015/0217839 | A1* | 8/2015 | Gasparro | B63B 35/7926 |
| | | | | 441/74 |
| 2015/0336641 | A1* | 11/2015 | Longo | B63B 35/7909 |
| | | | | 441/74 |
| 2016/0090157 | A1* | 3/2016 | Watts | A63B 31/10 |
| | | | | 441/65 |
| 2018/0091708 | A1* | 3/2018 | Riddiford | G03B 17/02 |
| 2018/0099734 | A1* | 4/2018 | Schibli | B63H 16/08 |
| 2018/0141624 | A1* | 5/2018 | Schroenn | B63B 35/7909 |
| 2018/0229820 | A1* | 8/2018 | Bell | B63B 35/7926 |
| 2018/0324341 | A1* | 11/2018 | Immel | H04N 5/2252 |

OTHER PUBLICATIONS

FCS Fins, https://www.thesurfboardwarehouse.com/default.aspx, Oct. 16, 2007, 2 pgs (Year: 2007).*

Ben Pascoe, 'Recommended Surf Photography Gear—2017—Learning Surf Photography', https://www.learningsurfphotography.com/recommended-surf-photography-gead, Mar. 12, 2017, 17 pgs (Year: 2017).*

* cited by examiner

FIN SHAPED UNDERWATER CAMERA HOUSING AND SYSTEM INCORPORATING SAME

CROSS-REFERENCE TO RELATED APPLICATION

This claims priority from U.S. Provisional Application Ser. No. 62/500,227, filed May 2, 2017, which is incorporated by reference herein in its entirety.

FIELD OF INVENTION

The present invention relates to an apparatus for capturing video footage from a camera mounted within the fin of a watersports board. More specifically, the present invention relates to two embodiments of an apparatus. In one embodiment, the camera is a custom camera mounted within the fin. In the second embodiment, the camera is a removable stand alone camera.

BACKGROUND

People throughout the globe enjoy going to the beach and spending substantial time in and around the water. More specifically, vast amounts of people take to surfing, paddle boarding and other board related activities on a daily basis. Participants enjoy filming these sports at all angles, and the public enjoys viewing such videos. Surfers, paddle boarders, and other board users often seek new and unique camera angles to capture their fun. Footage is readily available on the internet of athletes holding cameras, mounting cameras on different part of their bodies, using helicopters, drones, and other methods.

One particular angle that is very unique and desirable is an underwater view. More specifically, surfers often find bottle nose dolphins following their boards and riding the wake. Surfers have often wondered what the view from the dolphin's prospective would look like.

However, trying to film underwater video while surfing presents unique difficulties. The camera must be enclosed in a water housing. Existing water housings are typically bulky and are difficult to mount to a watersports board. Moreover, the water turbulence, speed of the surfboard, and the surfboard's rapid movements all make it difficult to keep a camera steady. Similarly, the sheer size and shape of existing underwater camera mounts adversely impact the performance of watersports boards.

Prior systems have been relegated to filming above the water, but there is an unmet need to capture angles from under the water. The few attempts at providing an underwater camera mount end up creating drag, and cannot be mounted to lighter weight items such as paddle boards and surfboards as a result of the drag. Thus there remains an unmet need for an apparatus or system which can be mounted to the underside of water vehicles that minimizes drag while providing a housing or system for incorporating a camera for filming from an underwater perspective.

SUMMARY OF INVENTION

The present invention provides a board mountable system for filming underwater video. The inventive board mountable system can be mounted to the underside of water vehicles for incorporating a camera for filming from an underwater perspective. The inventive board mountable system is shaped to minimize drag as a result of the mounted camera or camera system.

At least one embodiment of the system includes a fin shaped housing for holding a camera or camera system. In such embodiments, the fin is removably attached to the water vehicle, such as a surf board. The fin housing can be swapped with other fins being used with the water vehicle for controlling the direction of a watersports board in motion. These embodiments of the inventive system further include a connection means for connecting the fin to the underside of a water vessel.

BRIEF DESCRIPTION OF THE DRAWINGS

For the present invention to be clearly understood and readily practiced, the present invention will be described in conjunction with the following figures, wherein like reference characters designate the same or similar elements, which figures are incorporated into and constitute a part of the specification, wherein.

DETAILED DESCRIPTION

Figure 1:
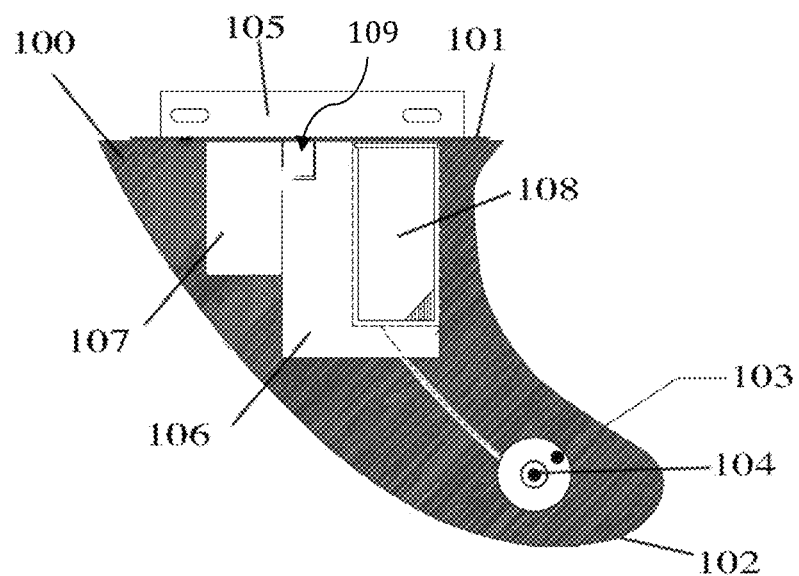
FIG. 1 illustrates a side view of a fin 100 that contains a built in camera.

The following detailed description is merely exemplary in nature and is in no way intended to limit the scope of the invention, its application, or uses, which may vary. The invention is described with relation to the non-limiting definitions and terminology included herein. These definitions and terminology are not designed to function as a limitation on the scope or practice of the invention, but are presented for illustrative and descriptive purposes only.

Various terms used throughout the specification and claims are defined as set forth below as it may be helpful to an understanding of the invention.

As used herein, "water vessel" shall mean any vehicle that may be used in the water including, but not limited to, a boat, a surfboard, a paddle board, skim board, water skiis, knee board, kayak, canoe, raft, sailboat, wakeboard, and the like.

A board mountable system for filming underwater video is provided. One embodiment of the system includes a fin for controlling the direction of a watersports board in motion, a housing for holding a camera or camera system which is removably attached to the fin, and a fin connection means for connecting the fin to the underside of a water vessel. Another embodiment of the present invention includes a system including a fin having a void within for holding a housing. The housing of this particular embodiment is for holding a camera or camera system. The fin further includes a fin connection means for connecting the fin to the underside of a water vessel.

Fin & Fin Connection Means

The fin is intended to be attached to a water vessel and to function as a guide to control the direction of the board. The fin has a proximal end, a distal end, and two sides. For the avoidance of doubt, the proximal end includes a fin connection means for connecting to a water vessel such as a surfboard, paddleboard, boat, or the like. In at least one embodiment, the fin further includes at least one void within for holding a housing for a camera or a camera system. Where included, it is appreciated that the void may be in the proximal end of the fin or the distal end of the fin or somewhere in between. In at least one embodiment, the fin includes an attachment means for connecting a housing to the fin, around the fin, or beneath the fin. It is appreciated that the fin can be made of many suitable materials known in the art. For example, the fin may be made from plastic, metal, fiberglass, ceramic, or combinations thereof. It is further appreciated that additional fins or different shaped fins may be used to help direct the vessel.

The inventive fin incorporating a housing for a camera further incorporates a fin connection means for connecting the fin to the underside of a water vessel. The fin connection means usually incorporates a slotted or channeled mechanism for interfacing with a like channel or slot which are commonly used on most water vessels. In some embodiments, the fin connection means may include a suction cup or adhesive for holding the inventive fin with incorporated camera housing to the water vessel. Several different fin connection means are known in the art and nothing herein is intended to limit such fin connection means. In some embodiments, the fin connection means may include a plurality of holes and attachments to make the fin adaptable to connect to numerous types of sports boards. It is appreciated that the fin connection means can be made of many suitable materials known in the art. For example, the fin connection means may be made from metal, plastic, Velcro, adhesive, screws, nails, or any combinations thereof.

Figure 2:
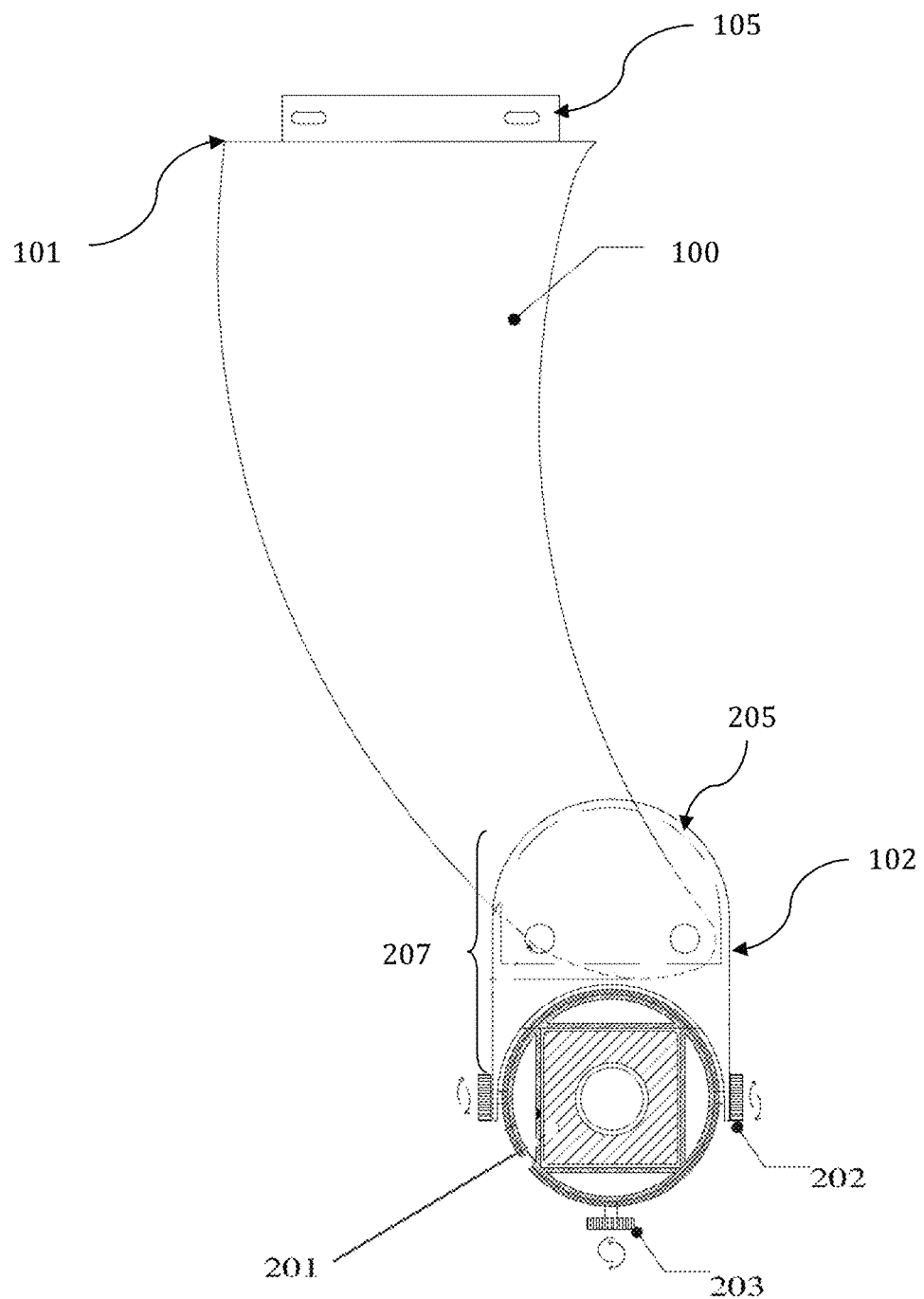
FIG. 2 illustrates a side view of a fin 100 that contains a water housing removably attached to a fin for which a camera can be removably inserted into the housing.
Figure 3:
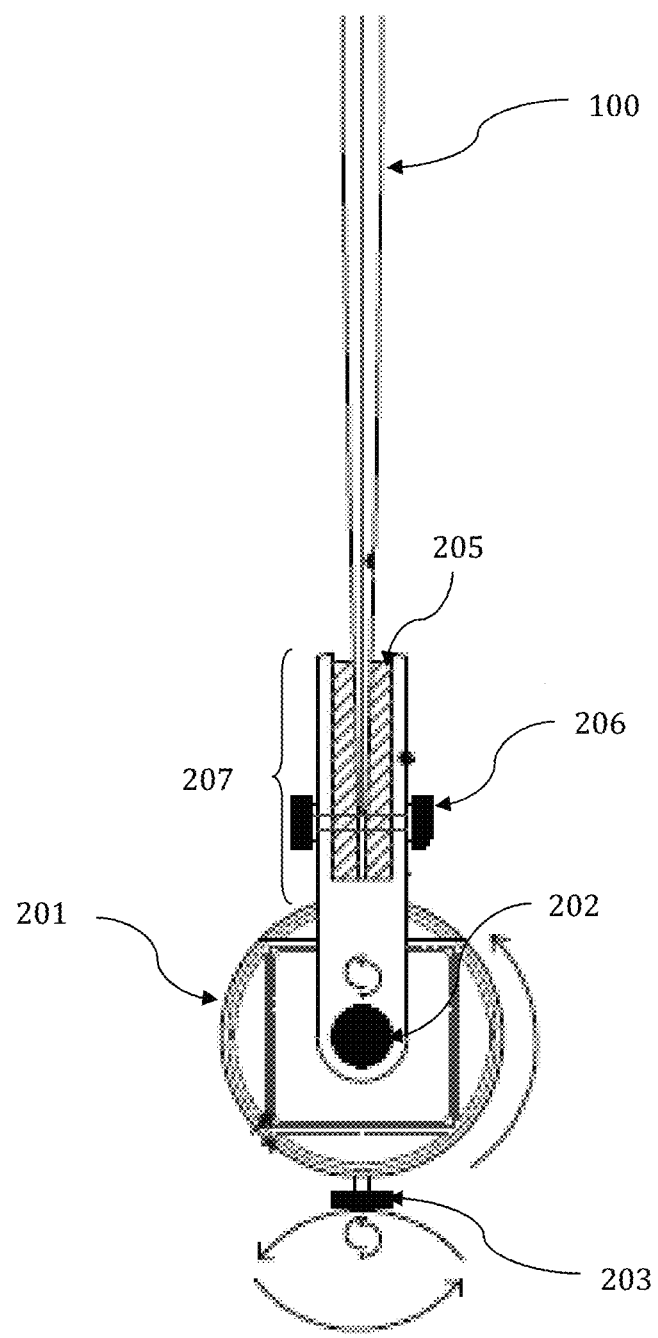
FIG. 3 provides a rear view of the fin 100 that contains a water housing removably attached to a fin for which a camera can be removably inserted into the housing, illustrating embodiments where the housing includes pan, title, and pitch adjustments for positioning the camera angle relative to the water vehicle that the fin is attached.

FIGS. 1-3 each illustrate the 100 fin in use in one or more embodiments. FIG. 1 provides a 100 fin having a 101 proximal end, a 102 distal end, at least two sides and a 103 void within. The 103 void houses a camera system (as described later within), and further includes a 105 fin connection means for connecting to a water vessel. FIGS. 2 and 3 similarly show a fin in use with a housing that has a 205 fin connection means for connecting to the 102 distal end of the 100 fin.

Housing

The housing provides the essential function of the present invention, which is to contain a camera in a fin for underwater use while a sports board is in motion. The housing is intended to be waterproof, water repellent or sealed such that it may house a camera or camera system without damaging the camera or camera system with water. The housing has an open position, a closed position, and a latch for locking the housing into the closed position wherein the closed position seals the housing.

Some embodiments the housing is attached to a housing assembly which allows the housing to be pivoted and rotated. In at least one embodiment, the housing is secured in the selected pivot and rotation position by one or more set screws. In other embodiments using the housing assembly with the housing, one or more motors or servos may be used for managing the rotational or pivot position of the housing within the housing assembly.

In at least one embodiment, the housing or the housing assembly includes a housing connection means for connecting to a fin. The housing connection means is intended to be used with a housing to connect the housing within the fin void, where used, to at least one side of the distal end of the fin, or may be connected to both sides of the distal end of the fin. Various means for connecting a housing within the void or to the distal end of the fin are relatively well known in the art. While screws and bolts may be used in securing a housing, nondestructive housing connection means are preferred. In at least one embodiment, the housing connection means attaches to the distal end of a fin. In other embodiments, the housing is suitable for fitting within the void of the fin. In this embodiment, the housing may contain either a camera or a camera system.

FIGS. 1-3 illustrate various embodiments of the inventive housing. FIG. 1 provides at least one embodiment where a void contains a housing which contains a camera system (to be discussed later). Other embodiments, such as those described in FIGS. 2 and 3, the 201 housing, having at least one 202 rotation (vertical) adjustment and at least one 203 pivot (horizontal) adjustment. The 201 housing further incorporates a 207 housing assembly having a 205 housing connection means and at least one 206 set screws for securing the 205 housing connection means to the 100 fin. The 202/203 adjustments are used to rotate the 201 housing within a 207 housing assembly allowing the user to set the camera to a plurality of pitch and angles.

Camera System

While several embodiments of the present invention incorporate an existing camera into a housing, other embodiments of the present invention integrate a camera system within the housing to be stored in the void of a fin. The camera system includes, at least, a power supply, a computer processing unit (CPU), a data storage unit, and at least one lens. In at least one embodiment, the camera system further includes a charging port which includes a waterproof cover. It is appreciated that the camera system is sensitive to water, thus it is intended, similar to the other embodiments, that any housing used to hold the camera system be waterproof. The camera lens, may be outside the housing connected by a waterproof cable. In at least one embodiment, the camera lens is mounted on at least one side of the fin.

FIG. 1 illustrates a cutaway view of at least one embodiment of the inventive camera system incorporated within a fin. The fin 100 stores a housing within a void. The housing contains a 106 computer-processing unit, a 107 power supply, a 108 data storage drive and a 109 charging port. It is appreciated that these components are in a water tight housing in a void within the fin, and typically cannot be seen (unless using a translucent material for the fin and housing).

EXAMPLES

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

Example 1

A long board for surfing is purchased which includes a removable fin. The fin is removed and replaced with the apparatus described herein. The same screws that were holding the original fin in place can be used to secure the replacement fin. The replacement fin has a built in camera system. The upper part of the fin contains a computer-processing unit, a power supply, and a data storage drive. A surfer powers on the camera system and begins recording at the beginning of the day and captures footage for the entirety of the time that surfing occurs. The surfer, at the end of the day, removes the fin containing the camera system, downloads the video captured, and charges the camera using the data/charging port.

Example 2

A 201 housing and a 207 housing assembly are purchased by a paddle boarder. The 201 housing includes two 202 rotation (vertical) adjustments and at least one 203 pivot (horizontal) adjustment. The 207 housing assembly includes a 205 connection means and a 206 set screw for holding the housing assembly and housing to the 100 fin. An illustration of the 201 housing and 207 housing assembly interfacing with the 100 fin is provided in FIG. 2 and FIG. 3.

Prior to entering the water, the paddle boarder secures the 205 housing connection means to the 102 distal end of the 100 fin. He powers on and sets a GoPro camera to record, then inserts the GoPro camera into the 201 housing and secures the 201 housing closed tightly to prevent any water from leaking in to the 201 housing. The user adjusts the 201 housing using the 202/203 adjustments to set the desired angles the user prefers to film. The user ventures on to paddle boarding.

When completed paddle boarding, the user removes the camera from the 201 housing, and removes the 205 connection means from the 100 fin. The user stores the board, and the 207 housing assembly for later use, and downloads the video content captures by the camera to his computer.

OTHER EMBODIMENTS

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

Exemplary inventive apparatus and methods are further provided in the attached materials provided herewith as Appendix A—totaling 7 pages, incorporated herein by reference to the same extent as if the appendix was specifically and individually indicated to be incorporated by reference in their entirety for text, figures, and all other information.

What is claimed is:

1. A housing system for holding a camera for the connection to a fin of a water vessel, the housing system comprising:
   a housing, said housing being water tight and suitable for holding at least one camera;
   a housing assembly for holding the housing having one or more adjustments allowing the user to set the camera to a plurality of pitch and angles; and
   a housing connection means for interfacing with a fin on a water vessel, said connection means being part of the housing assembly.

* * * * *